United States Patent
Sako

(10) Patent No.: US 12,131,079 B2
(45) Date of Patent: Oct. 29, 2024

(54) PRINTING APPARATUS, CONTROL METHOD, AND COMPUTER READABLE MEDIUM WITH ERROR NOTIFICATION CONTROL

(71) Applicant: CANON KABUSHIKI KAISHA, Tokyo (JP)

(72) Inventor: Ritsuto Sako, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/340,150

(22) Filed: Jun. 23, 2023

(65) Prior Publication Data
US 2024/0012587 A1    Jan. 11, 2024

(30) Foreign Application Priority Data
Jul. 8, 2022    (JP) .................................. 2022-110588

(51) Int. Cl.
*G06F 3/12*    (2006.01)

(52) U.S. Cl.
CPC ............ *G06F 3/121* (2013.01); *G06F 3/1234* (2013.01); *G06F 3/1259* (2013.01)

(58) Field of Classification Search
CPC ...... G06F 3/121; G06F 3/1234; G06F 3/1259; G06F 3/1229
See application file for complete search history.

(56) References Cited

U.S. PATENT DOCUMENTS

| | | | |
|---|---|---|---|
| 2015/0317104 A1 | 11/2015 | Takenouchi | |
| 2017/0353615 A1* | 12/2017 | Hasegawa | G06F 3/1234 |
| 2018/0267755 A1* | 9/2018 | Okazawa | G06F 3/1234 |
| 2019/0104015 A1* | 4/2019 | Moore | H04L 67/141 |
| 2021/0178279 A1 | 6/2021 | Juenger et al. | |
| 2021/0306203 A1* | 9/2021 | Landais | H04L 67/02 |

FOREIGN PATENT DOCUMENTS

JP    2013129146 A    7/2013

OTHER PUBLICATIONS

English Machine Translation of JP 2013-239939-A (Kinoshita, Published Nov. 28, 2013) (Year: 2013).*
Extended European search report issued in European Appln. No. 23179655.8, mailed on Nov. 7, 2023.

* cited by examiner

*Primary Examiner* — Juan M Guillermety
(74) *Attorney, Agent, or Firm* — ROSSI, KIMMS & McDOWELL LLP

(57) ABSTRACT

A printing apparatus that executes printing on a basis of print data obtained from a server system is provided. The printing apparatus transmits a notification of a state of the printing apparatus according to progress of the printing to the server system; receives from the server system a response to the notification of the state transmitted; outputs an error according to the response when the response received does not indicate transmission success and does not indicate that a load of the server system exceeds an upper limit; and continues processing without outputting an error when the response received indicates transmission success or indicates that the load of the server system exceeds the upper limit.

11 Claims, 12 Drawing Sheets

FIG. 8

| | |
|---|---|
| | printer-state |
| 801 | idle |
| 802 | processing |
| 803 | stopped |

FIG. 9

| STATUS CODE | | ERROR CONTROL 911 |
|---|---|---|
| GENERAL CLASSIFICATION | SUB-CATEGORY | |
| 901  Informational(1xx) | any | NORMAL |
| 902  Success(2xx) | any | NORMAL |
| 903  Client Error(4xx) | 429 too many requests | NORMAL |
| 904 | OTHER THAN 429<br>400 Bad Request<br>401 Unauthorized<br>402 Payment Required<br>403 Forbidden<br>404 Not Found | ERROR |
| 905  Server Error(5xx) | any | ERROR |

CLOUD PRINTING SETTINGS

USE CLOUD PRINTING   [ON]   [OFF]

[TENANT A]

[TENANT B]

[ADD TENANT]

1302

CLOUD PRINTING SETTINGS FOR TENANT A

CANCEL REGISTRATION   [EXECUTE]

CONTROL SERVER LOAD ERROR   [DISPLAY ERROR]   [HIDE ERROR]

PRINTING APPARATUS, CONTROL METHOD, AND COMPUTER READABLE MEDIUM WITH ERROR NOTIFICATION CONTROL

BACKGROUND OF THE INVENTION

Field of the Invention

The present invention relates to a printing apparatus, a control method, and a computer readable medium for a cloud printing service.

Description of the Related Art

In a known printing service, printing is implemented by the user transmitting a print job directly from a client terminal such as a PC to a printing apparatus. However, in recent years, cloud printing services have been developed that use a cloud service provided on the Internet. In a cloud printing service, a print job is transmitted from a client terminal to the cloud printing service, and the print job is obtained from the cloud printing service by a printing apparatus registered in the cloud printing service and executed.

At this time, when the state of the printing apparatus changes, the printing apparatus transmits a device state notification notifying of the post-change state to the cloud printing service. The device state notification is a request transmitted to the cloud printing service and is also referred to as a device state notification request. States of the printing apparatus include an idle indicating a standby state and a processing indicating an in-progress state. When the printing apparatus starts printing, the state of the printing apparatus changes from the idle state to the processing state. The printing apparatus transmits the change in state to the cloud printing service via a device state notification. Also, when the printing apparatus ends printing, the state of the printing apparatus changes from the processing state to the idle state. The printing apparatus transmits this change in state also to the cloud printing service via a device state notification.

In a cloud printing service, the number of printing apparatuses registered increases as the service area increases. Thus, in the cloud printing service, the processing load from requests from printing apparatuses increases. In particular, since multiple device state notifications for a printing apparatus may occur in the processing of one print job, the processing load caused by device state notifications may increase. To reduce the processing load from the device state notifications from printing apparatuses, the cloud printing service restricts the number of device state notifications that can be processed per unit time. When the number of device state notifications or other requests exceed the upper limit, an error indicating that there are too many requests (upper limit exceeded) is returned to the request source printing apparatus.

In the other hand, as a technique to reduce the communication load from state confirmation notifications sent between a cloud printing server and a plurality of printing apparatuses, the invention described in Japanese Patent Laid-Open No. 2013-129146 has been proposed. The configuration described in Japanese Patent Laid-Open No. 2013-129146 includes a printer corresponding to the master performing state confirmation communication with a cloud printing server and a printer corresponding to a slave not performing state confirmation communication with the cloud printing server.

However, with the method described in Japanese Patent Laid-Open No. 2013-129146, though the number of device state notifications can be reduced, the state of all of the printing apparatuses registered with the cloud printing service cannot be grasped by the cloud printing service. Also, with this method, a process to determine which printing apparatus is a master and which is a slave must be performed, which may result in the processing load of the printing apparatuses being increased.

Furthermore, with a method in which an error is sent as a response to a device state notification when the number of requests received per unit time exceeds the upper limit, the error is displayed on the user interface (UI) of the printing apparatus. Since the device state notification request was not transmitted at the volition of the user, when shown the error, a typical user is unlikely to understand the cause or subject matter, and confusion may occur at the cloud printing service usage site.

SUMMARY OF THE INVENTION

The present invention realizes easy usage of a cloud printing service with a state of a printing apparatus being reliably grasped and notifications of errors that do not require user action being suppressed.

The present invention has the following configuration. The first aspect of the present invention is a printing apparatus that executes printing on a basis of print data obtained from a server system, comprising: at least one processor and at least one memory comprising at least one program, wherein the at least one program is configured to cause the at least one processor to: transmit a notification of a state of the printing apparatus according to progress of the printing to the server system; from the server system, receive a response to the notification of the state transmitted; and output an error according to the response when the response received does not indicate transmission success and does not indicate that a load of the server system exceeds an upper limit, and continue processing without outputting an error when the response received indicates transmission success or indicates that the load of the server system exceeds the upper limit.

The second aspect of the present invention is a non-transitory computer readable medium having stored a program thereon for causing a computer to: transmit a notification of a state of the printing apparatus according to progress of the printing to the server system; from the server system, receive a response to the notification of the state transmitted; and output an error according to the response when the response received does not indicate transmission success and does not indicate that a load of the server system exceeds an upper limit, and continue processing without outputting an error when the response received indicates transmission success or indicates that the load of the server system exceeds the upper limit.

The third aspect of the present invention is a control method for a printing apparatus that executes printing on a basis of print data obtained from a server system and includes transmitter, receiver, and controller, comprising: the transmitter transmitting a notification of a state of the printing apparatus according to progress of the printing to the server system; the receiver receiving a response to the notification of the state transmitted from the server system; and the controller outputting an error according to the response when the response received does not indicate transmission success and does not indicate that a load of the server system exceeds an upper limit, and continuing processing without outputting an error when the response received indicates transmission success or indicates that the load of the server system exceeds the upper limit.

According to the present invention, easy usage of a cloud printing service can be realized with a state of a printing apparatus being reliably grasped and notifications of errors that do not require user action being suppressed.

Further features of the present invention will become apparent from the following description of exemplary embodiments with reference to the attached drawings.

BRIEF DESCRIPTION OF THE DRAWINGS

FIG. 8 is a diagram illustrating the types of device states of the printing apparatus.

FIG. 9 is a diagram illustrating the types of error statuses received by the printing apparatus.

FIG. 13 is a diagram illustrating a cloud printing settings screen according to a fourth embodiment.

DESCRIPTION OF THE EMBODIMENTS

Figure 1:
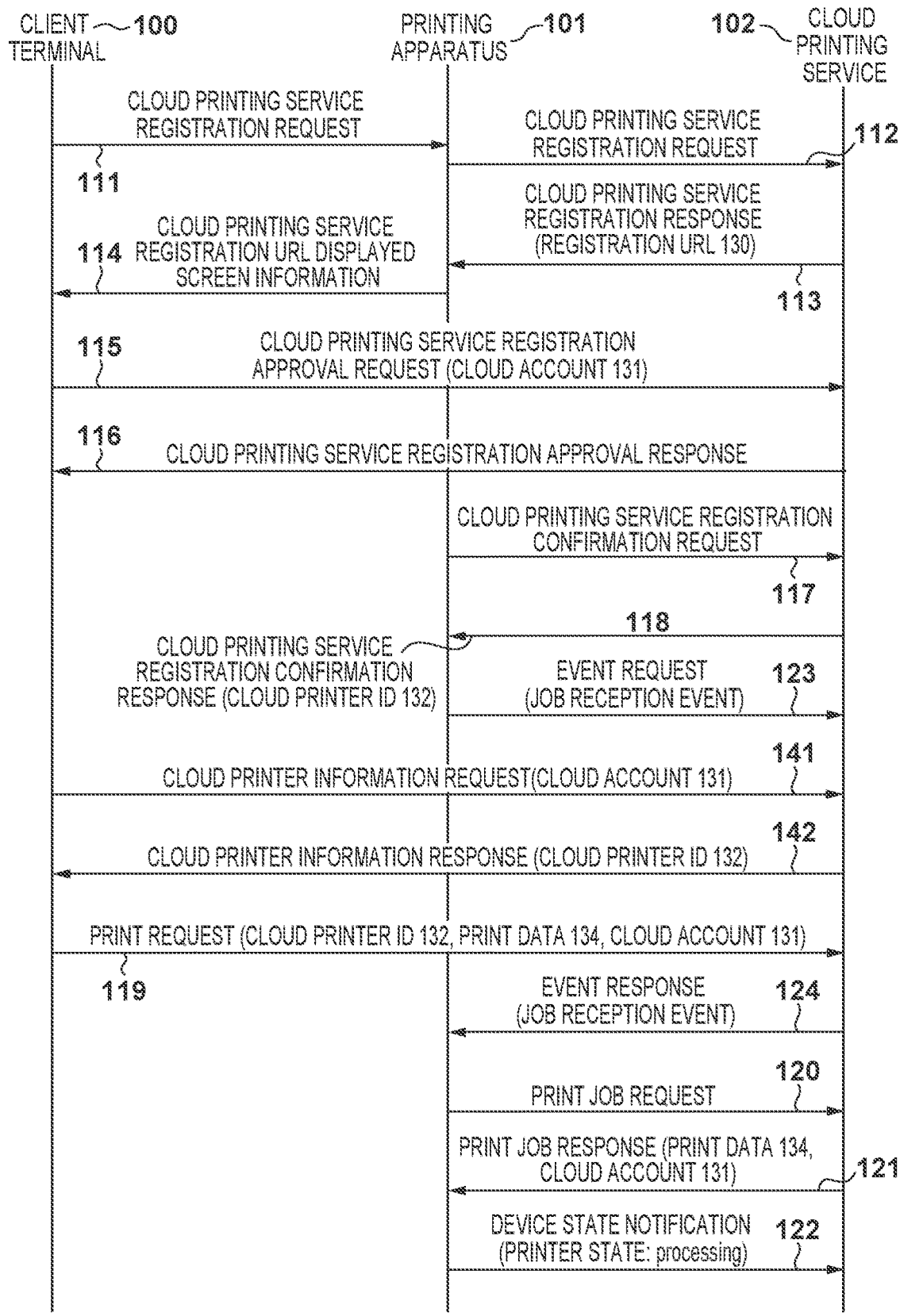
FIG. 1 is a diagram illustrating a processing sequence of cloud printing.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Hardware

Figure 2A:
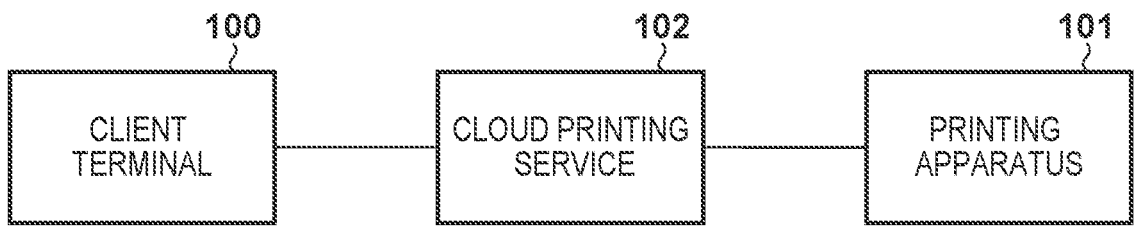
FIG. 2A is a diagram illustrating the configuration of a cloud printing system.

FIG. 2A is a diagram illustrating the configuration of a cloud printing system, which is an embodiment of the present invention. A cloud printing service 102 is a service provided by one or more servers connected to a client terminal 100 and a printing apparatus 101 via the Internet or the like, for example. In this example, the cloud printing service 102 refers to a server that is an information processing apparatus providing the cloud printing service.

In the present embodiment, the printing apparatus 101 and the cloud printing service 102 communicate with one another using the Internet Printing Protocol (IPP). Hereinafter, the IPP operations will be described using attributes.

Figure 2B:
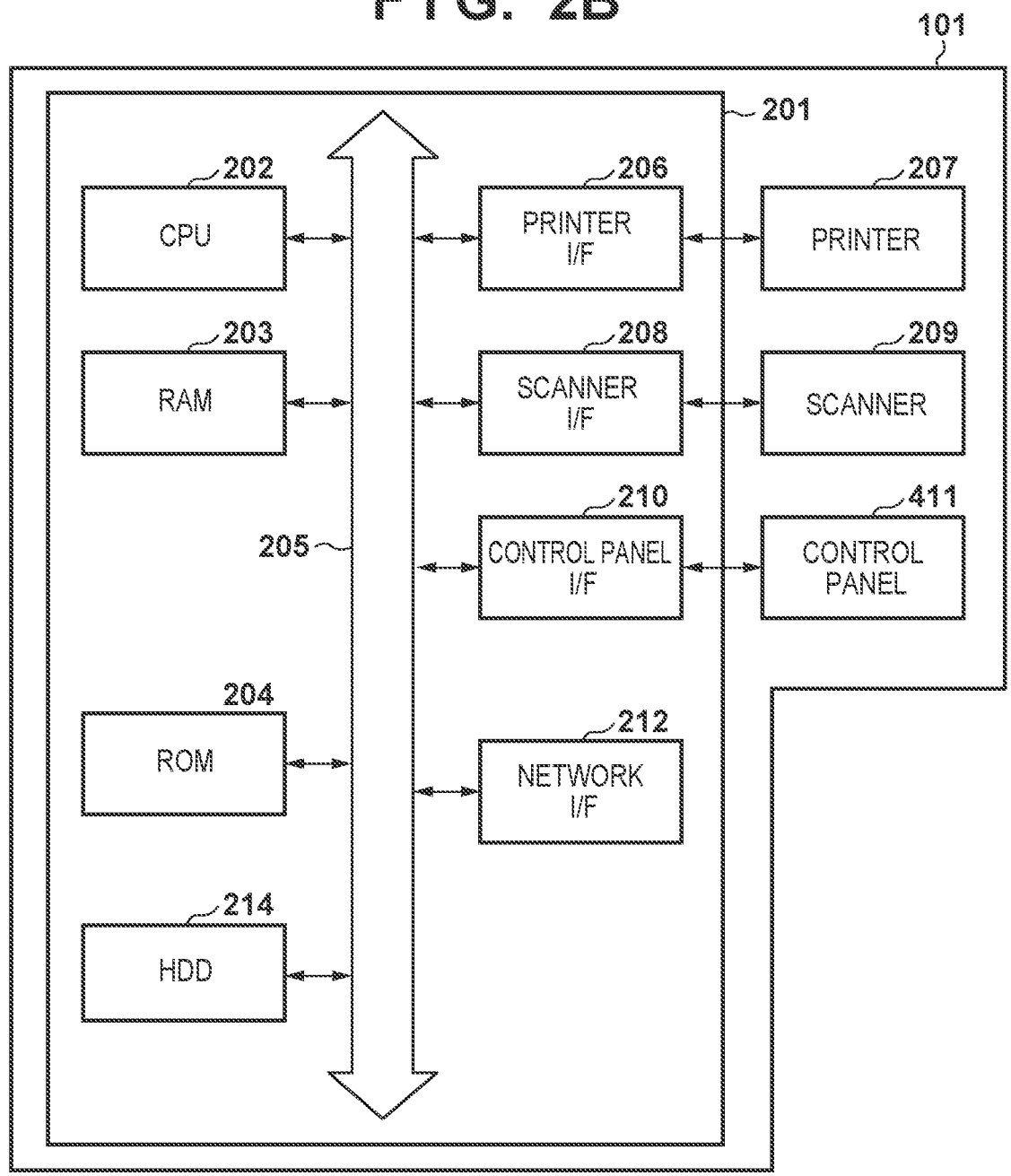
FIG. 2B is a diagram illustrating the hardware configuration of a printing apparatus.

FIG. 2B is a block diagram illustrating the hardware configuration of the printing apparatus 101 according to the present invention. A control unit 201 including a central processing unit (CPU) 202 controls the entire operations of the printing apparatus 101. The CPU 202 executes control of various types including communication control by reading out and executing a control program stored in a ROM 204. A RAM 203 is used as a temporary storage area, for example, the main memory of the CPU 202, a working area, and the like. An HDD 214 stores data, various programs, and/or information tables.

A printer interface (I/F) 206 is an interface that outputs an image signal to a printer 207 (printer engine). Also, a scanner OF 208 is an interface that inputs a read image signal from a scanner 209 (scanner engine). The CPU 202 processes the image signal input by the scanner OF 208 and outputs this as a record image signal to the printer OF 206. The printer 207 forms an image on a medium such as a sheet according to the record image signal.

A control panel OF 210 connects a control panel 411 and the control unit 201. The control panel 411 is provided with a liquid crystal display unit with a touch panel function, a keyboard, or the like. A network OF 212 transmits information to an external terminal, such as the client terminal 100, a cloud printing service 102, or the like, receives various information from the external apparatuses, and the like. The blocks in the control unit 201 are connected via a system bus 205. Note that the printing apparatus 101 may also be referred to as a printer, an image forming apparatus, or a recording apparatus.

The client terminal 100 and the cloud printing service 102 includes the configuration illustrated in FIG. 2B without the printer OF 206, the printer 207, the scanner OF 208, and the scanner 209. However, the performance of the CPU 202 and the capacity of the RAM 203 and the HDD 214 are not necessarily equal, and the client terminal 100 and the cloud printing service 102 may have higher performance. This is also true for the control panel 411, and the general-purpose display capability of the client terminal 100 and the cloud printing service 102 may be higher.

Software

Figure 3:
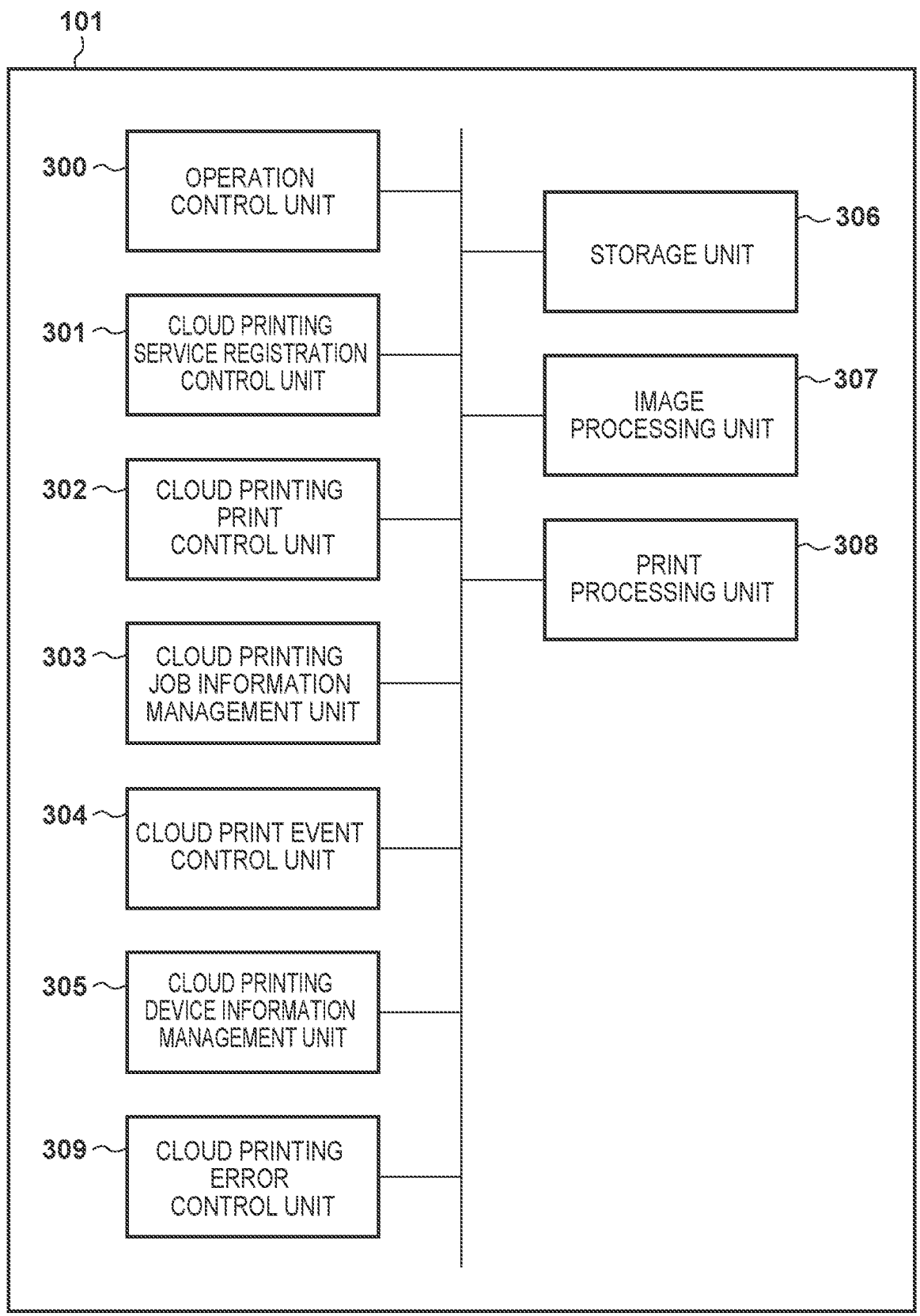
FIG. 3 is a diagram illustrating the software configuration of the printing apparatus.

FIG. 3 is a diagram for describing the software configuration of the printing apparatus 101. The functional units illustrated in FIG. 3 are implemented by a CPU 202 included in the printing apparatus 101 executing a control program.

An operation control unit 300 controls the control panel 411. The operation control unit 300 displays an operation menu on the control panel 411, receives the input of an instruction from a user, notifies other functional units of the contents of the received instruction, and displays the instruction result on the control panel 411. A cloud printing service recording control unit 301 analyzes a cloud printing service registration request received from the client terminal 100 and transmits the cloud printing service registration request to the cloud printing service 102. In this manner, the cloud printing service registration processing is controlled.

A cloud printing print control unit 302 transfers print data received from the cloud printing service 102 to an image processing unit 307. The image processing unit 307 executes processing to render the print job into image data for printing. A print processing unit 308 executes processing to print the image data rendered by the image processing unit 307.

A cloud print job information management unit 303 manages the job information of the printing apparatus 101 and notifies the cloud printing service 102. A cloud print event control unit 304 controls event transmission and event reception processing between the printing apparatus 101 and the cloud printing service 102. A cloud printing device information management unit 305 manages the device information of the printing apparatus 101 and notifies the cloud printing service 102. A cloud printing error control unit 309 manages the error occurrence state of the printing apparatus 101.

A storage unit 306, in response to an instruction from another functional unit, stores specified data in the ROM 204 or the HDD 214 or reads out stored data. Examples of data managed by the storage unit 306 include ID information for identifying a device and QR code (registered trademark) image information.

Control Panel

Figure 4:
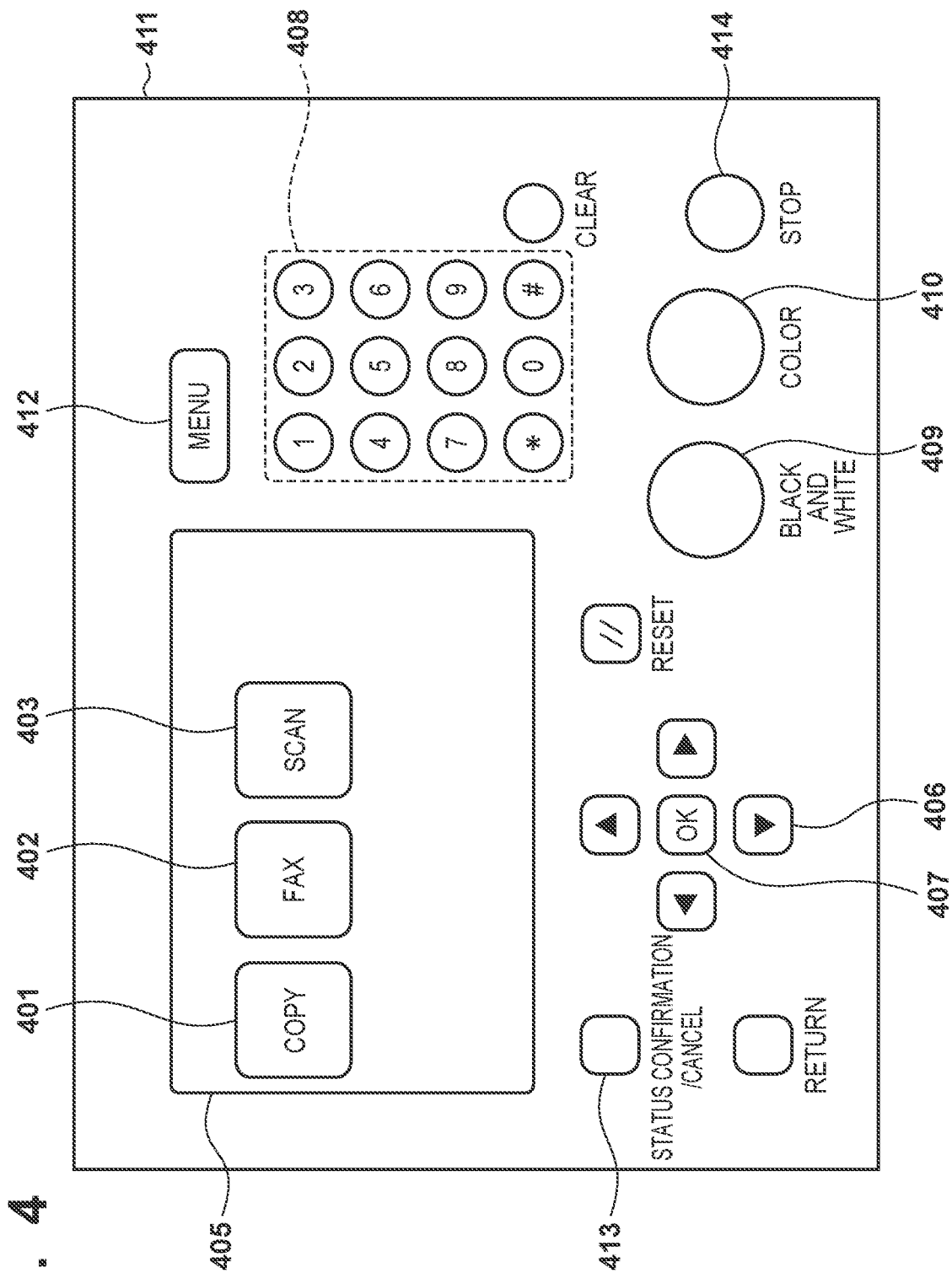
FIG. 4 is an explanatory diagram of a control panel of the printing apparatus.

FIG. 4 is a diagram for describing the control panel 411 of the printing apparatus 101. A display panel 405 is a device for providing a UI and includes a display panel and a touch panel using LCD or the like. A copy button 401 is a button that is pressed to perform copying using the printing apparatus 101, and by pressing the copy button 401, a copy operation screen is displayed on the display panel 405. A facsimile button 402 is a button that is pressed to send a fax using the printing apparatus 101, and by touching the facsimile button 402, a fax operation screen is displayed on the display panel 405. A scan button 403 is a button that is pressed to perform scanning using the printing apparatus 101, and by pressing the scan button 403, a scan operation screen is displayed on the display panel 405. Also, a QR code (registered trademark) image or the like is displayed on the display panel 405.

A ten key 408 is used to input numbers and the like. An OK key 407 is used when confirming display contents of the display panel 405. A directional key 406 is used when selecting a menu or the like displayed on the display panel 405. A black and white copy button 409 and color copy button 410 are used to perform black and white copying and color copying, respectively. A stop button 414 is used to stop processing. A menu button 412 is used to display a menu screen for setting the settings of the printing apparatus 101. A status confirmation/cancel button 413 is used to display a list of print jobs received by the printing apparatus 101 and to confirm the status of the printing apparatus 101.

Cloud Printing Processing Sequence

The cloud printing processing sequence will now be described using FIG. 1. The printing apparatus 101 supports a cloud printing function and a Web UI (also referred to as remote UI) function for operating the printing apparatus 101. The client terminal 100 supports a cloud printing client function and a Web UI client for operating the Web UI. The Web UI function is a function for providing the user interface (UI) of the printing apparatus 101 to a HTTP client (a Web UI client such as a web browser) of the client terminal 100, with the printing apparatus 101 functioning as the HTTP server, for example.

The user first uses the Web UI client of the client terminal 100 and transmits a cloud printing service registration request 111 to the printing apparatus 101 via the Web UI. When the printing apparatus 101 receives the request 111, the printing apparatus 101 transmits a cloud printing service registration request 112 to the cloud printing service 102. When the cloud printing service 102 receives the request 112, the cloud printing service 102 transmits a cloud printing service registration response 113 including a registration URL 130 for cloud printing registration to the printing apparatus 101. When the printing apparatus 101 receives the response 113, the printing apparatus 101 transmits registration URL display screen information 114 including a cloud printing service registration URL to the client terminal 100 via the Web UI.

When the client terminal 100 receives the screen information 114, the client terminal 100 displays the registration URL on the Web UI client. The user operates the Web UI client of the client terminal 100 and accesses the displayed registration URL. Accordingly, the client terminal 100 transmits a cloud printing service registration approval request 115 including a cloud account 131 to the cloud printing service 102.

When the cloud printing service 102 receives the registration approval request 115, the cloud printing service 102 transmits a cloud printing service registration approval response 116 to the client terminal 100. The cloud account 131 displays a user with the privilege to use the cloud printing service 102, and the user registers a user account with the cloud printing service 102 in advance.

The printing apparatus 101 transmits a cloud printing service registration confirmation request 117 to the cloud printing service 102. When the cloud printing service 102 receives the registration confirmation request 117, cloud printing service 102 transmits a cloud printing service registration confirmation response 118 including a cloud printer ID 132 to the printing apparatus 101. At this stage, the printing apparatus 101 is now registered with the cloud printing service 102 and the cloud printing service is able to be used. In other words, the printing apparatus 101 is registered with the cloud printing service 102 and is a printing apparatus that can be used by a user with an approved account in the cloud printing service.

The printing apparatus 101 registered with the cloud printing service 102 transmits an event request 123 to the cloud printing service 102. In the event request 123, a job reception event is specified as a type of event to be requested. In this manner, when a job reception event occurs in the cloud printing service 102, an event response is transmitted from the cloud printing service 102 to the printing apparatus 101.

In response to an operation by the user wanting to print using the cloud printing service 102, the client terminal 100 transmits a cloud printer information request 141 to the cloud printing service 102. The cloud printer information request 141 includes the cloud account 131. When the cloud printing service 102 receives the cloud printer information request 141, printer information (for example, the cloud printer ID 132) that can be used by the cloud account 131 included in the cloud printer information request 141 is obtained. Then, a cloud printer information response 142 including the obtained printer information is transmitted to the client terminal 100.

The client terminal 100 transmits the cloud printer ID 132 selected by the user from among the useable printing apparatuses, print data 134 corresponding to data to be printed, and a print request 119 including the cloud account 131 to the cloud printing service 102. In this example, the cloud printer ID 132 includes the ID of the printing apparatus 101. When the print request 119 is received, the cloud printing service 102 stores information, for example the cloud printer ID 132, the print data 134, and the cloud account 131, received together with the print request 119. Also, the cloud printing service 102 transmits an event response 124 to the printing apparatus 101 which is the transmission source of the event request. The event response 124 is a message transmitted as a response to the event request 123 that specifies a job reception event as a type of event.

When the event response 124 is received, the printing apparatus 101 transmits a print job request 120 to the cloud printing service 102. The cloud printing service 102 transmits a print job response 121 including the print data 134 and the cloud account 131 to the printing apparatus 101. The printing apparatus 101 prints the received print data.

When the state of the printing apparatus changes, the printing apparatus 101 transmits a device state notification 122 to the cloud printing service 102. In the present sequence, when the printing apparatus starts printing, the state of the printing apparatus changes from the idle state (standby state) to the processing state (processing in progress state). Accordingly, the printer state in the device state notification 122 is set to processing. The cloud printing service 102 responds to the device state notification 122, but this response will be described later with reference to FIG. 5. Note that the device state notification 122 is implemented via an Update-Output-Device-Attributes message using IPP.

Device State Notification and Response

Figure 5:
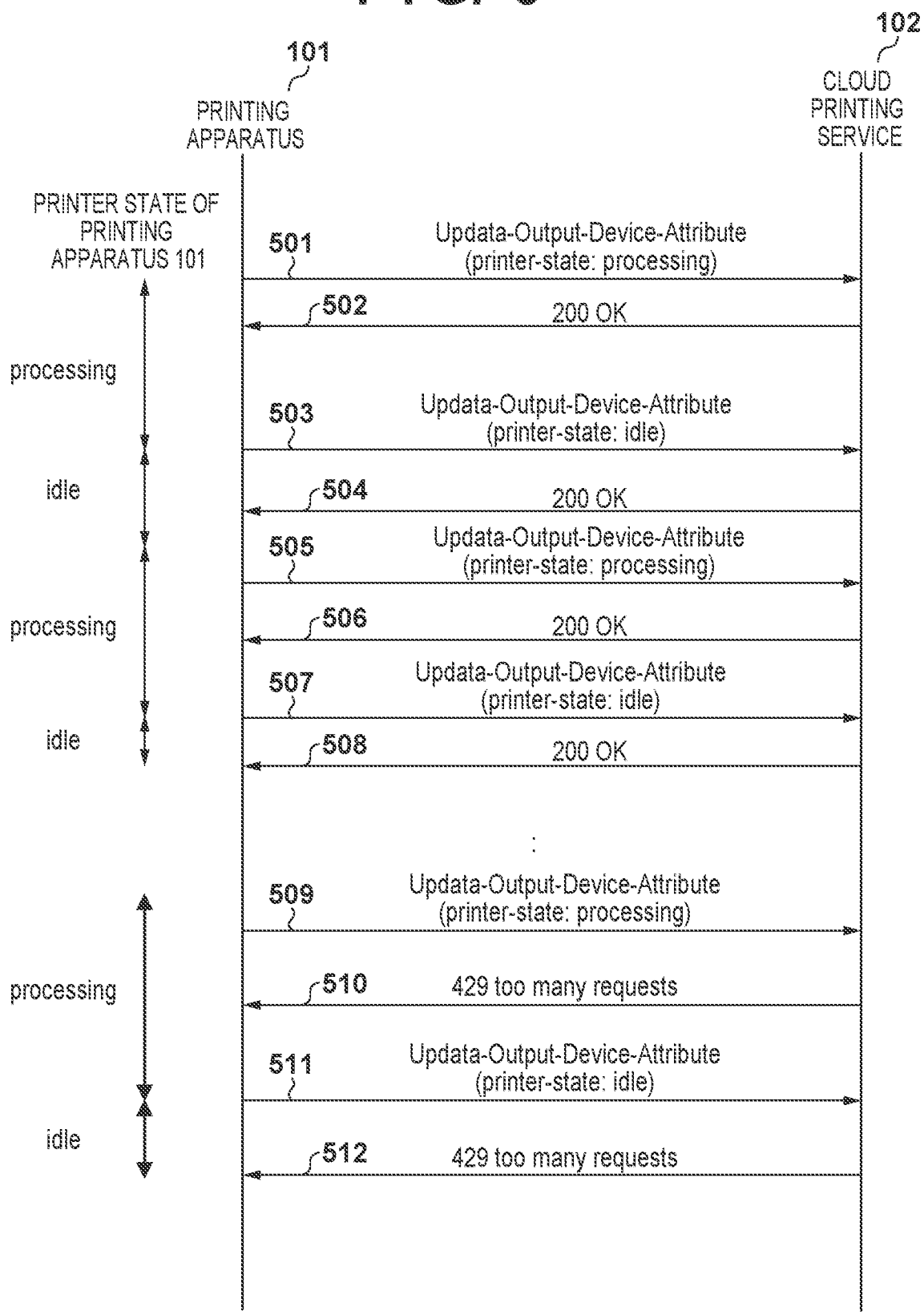
FIG. 5 is a sequence diagram of when the printing apparatus processes consecutive jobs.

FIG. 5 is a sequence diagram of when the printing apparatus processes consecutive jobs. When the printing apparatus 101 receives the print job response 121 from the cloud printing service 102, the printing processing of the received print data 134 is started. When the printing apparatus 101 starts the printing processing, the device state of the printing apparatus 101 changes to the processing state. The processing state refers to a state in which the printing apparatus is executing a print job and any new jobs received are put on standby. Note that the destination URL when the printing apparatus 101 transmits a request to the cloud printing service 102 includes the cloud printer ID 132 attached to the path. The cloud printing service 102 references this information and identifies the transmission source device of the request. Also, an IPP message is used in the description of FIG. 5.

When the state of the printing apparatus 101 changes to the processing state, the printing apparatus 101 sets processing as the printer-state attribute using Update-Output-Device-Attributes and transmits this (501). The Update-Output-Device-Attributes message is an IPP operation that corresponds to the device state notification 122 in FIG. 1, and the printer-state attribute corresponds to the printer state. Accordingly, as with the device state notification, the Update-Output-Device-Attributes message is a request to the cloud printing service 102. In FIG. the Update-Output-Device-Attributes message can be read as the device state notification 122, and the printer-state attribute can be read as the printer state.

When the cloud printing service 102 receives Update-Output-Device-Attributes 501, the state of the printing apparatus 101 managed in the cloud printing service 102 is updated to processing (processing in progress state). Also, as a response 502, 200 OK is transmitted as a response to the printing apparatus 101. In this example, 200 is a response code and indicates that the request has been normally received (that is, the request is OK).

When the printing apparatus 101 ends the printing processing, the device state of the printing apparatus 101 changes to the idle state (standby state). The idle state is a state in which the printing apparatus is not processing any print jobs and printing processing for any new jobs received can be started without waiting time.

When the printer state of the printing apparatus 101 changes to the idle state, the printing apparatus 101 sets idle as the printer-state attribute using Update-Output-Device-Attributes, an IPP operation, and transmits this (503). When the cloud printing service 102 receives a request 503, the state of the printing apparatus 101 managed in the cloud printing service 102 is updated to idle, and 200 OK is sent to the printing apparatus 101 as a response (504).

When consecutive jobs are printed, the next job is spooled in the printing apparatus 101 currently printing and put in a standby state. When the job ends and the device state transitions to the idle state, the printing apparatus 101 extracts and executes the top job from the spooled jobs, or in other words, printing of the top job is started.

As described above, in response to a change in the printer state, the printing apparatus 101 exchanges data with the cloud printing service 102 starting with Update-Output-Device-Attributes 505 and ending with a response 508. With this exchange, the printing apparatus 101 notifies the cloud printing service 102 that printing has started and the device state has changed to the processing in progress state and that printing has ended and that the device state has changed to the standby state. In this manner, the printing apparatus 101 notifies the cloud printing service 102, that is the server, of the state of the printing apparatus 101 according to the progress of the printing.

Next, a sequence will be described of when consecutively processing multiple jobs causes the cloud printing service 102 to be unable to process Update-Output-Device-Attributes.

When the printer state of the printing apparatus 101 changes to the processing state, the printing apparatus 101 transmits Update-Output-Device-Attributes, which is an IPP operation (509). At this time, in the printer-state attribute, processing is set as the device state. When the cloud printing service 102 receives a request 509 but the number of received requests has exceeded the maximum (upper limit) number able to be processed per unit time, no processing is executed and a response of 429 "too many requests" is transmitted to the printing apparatus 101 (510). 429 is a response code indicating too many requests (upper limit exceeded or upper limit error). The printing apparatus 101, after receiving the response 429 "too many requests" (upper limit exceeded), continues executing processing without executing error processing or a similar particular processing in the same manner as if the normal response 200 had been received. However, in a case where the printing apparatus 101 records a log, the reception of the response 429 "too many requests" (upper limit exceeded) is recorded in the log. The processing in this case will be described in detail with reference to FIG. 6 and the like.

When the printer state of the printing apparatus 101 changes to the idle state, the printing apparatus 101 sets idle as the printer-state attribute using Update-Output-Device-Attributes, an IPP operation, and transmits this (511). When the cloud printing service 102 receives a request 511 but the maximum number able to be processed per unit time has been exceeded, no processing is executed by the cloud printing service 102 and the response of 429 "too many requests" is transmitted to the printing apparatus 101 (512).

In this manner, when the number of requests received by the cloud printing service 102 exceeds the upper limit number able to be processed per unit time, an upper limit exceeded response to the received request is transmitted to the printing apparatus 101 as a response. When the number of requests received by the cloud printing service 102 is equal to or less than the upper limit number able to be processed per unit time, unless there is an error, a normal response to transmitted to the printing apparatus 101.

Response Processing by Printing Apparatus 101

Figure 6:
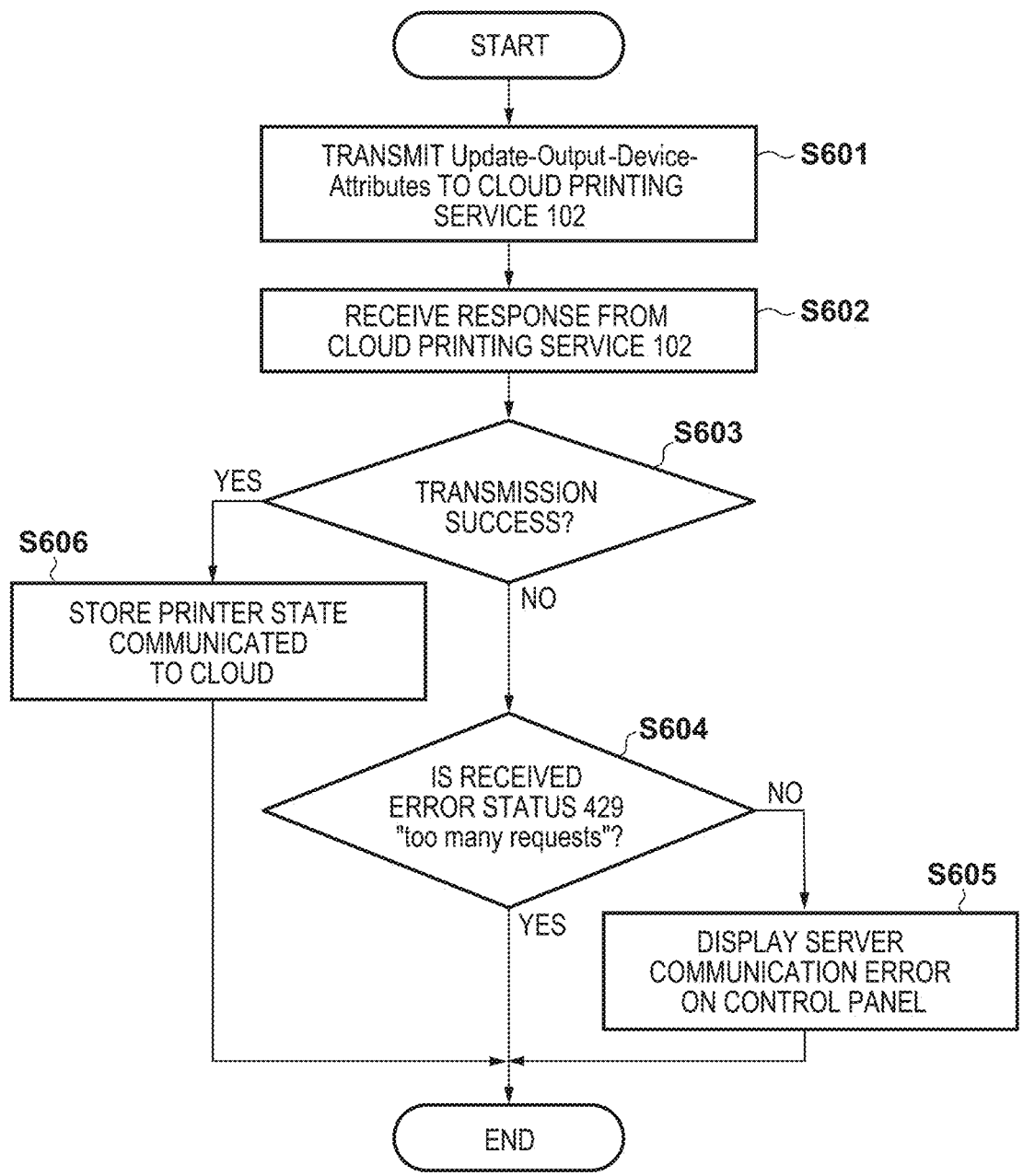
FIG. 6 is a flowchart of when the printing apparatus transmits a device state notification.

FIG. 6 is a flowchart of when the printing apparatus 101 transmits a device state notification. The process in FIG. 6 described below is executed by the functional blocks such as the cloud printing device information management unit 305 implemented by a program being executed by the CPU 202. However, on the hardware side, this may be executed by the CPU 202 of the printing apparatus 101.

In step S601, the cloud printing device information management unit 305 transmits Update-Output-Device-Attributes, in other words, a device state notification, to the cloud printing service 102. At this time, in the Update-Output-Device-Attributes, the printer-state attribute is set and the printer state (in other words, the device state) specified as the attribute value is set.

In step S602, the cloud printing device information management unit 305 receives a response to the Update-Output-Device-Attributes transmitted in step S601 from the cloud printing service 102.

In step S603, the cloud printing device information management unit 305 references the status code of the response received in step S602 and proceeds to step S606 if it is determined to be a success (for example, code 200) and proceeds to step S604 if it is determined to be an error. An error may be a status other than a success.

In step S606, the cloud printing device information management unit 305 stores the printer state communicated by the cloud printing service 102 in the storage unit 306.

In step S604, the cloud printing error control unit 309 analyzes the contents of the received error and determines whether or not the status code is 429 "too many requests" (upper limit exceeded). When the status code is 429 "too many requests", the processing ends. When the status code is not 429 "too many requests", in step S605, the operation control unit 300 displays a server communication error on the control panel 411. Note that the error may be displayed on the Web UI of the client terminal 100 which is the transmission source of the print request 119 (or a remote user interface).

According to this process, when the error status received as a device state notification response is upper limit exceeded, the user is not notified of the error and the processing in FIG. 6 ends. However, processing of the device state notification response illustrated in FIG. 6 ends the processing. By ending the processing in FIG. 6, normal processing executed by the printing apparatus 101, such as printing processing, communication processing, display processing, and the like, can be continued. Also, at this time, the communicated device state is not stored in the cloud printing service 102. In this manner, the conformity between the device state communicated to the cloud printing service 102 stored in the printing apparatus 101 and the device state stored in the cloud printing service 102 can be maintained.

Display Example

Figure 7:
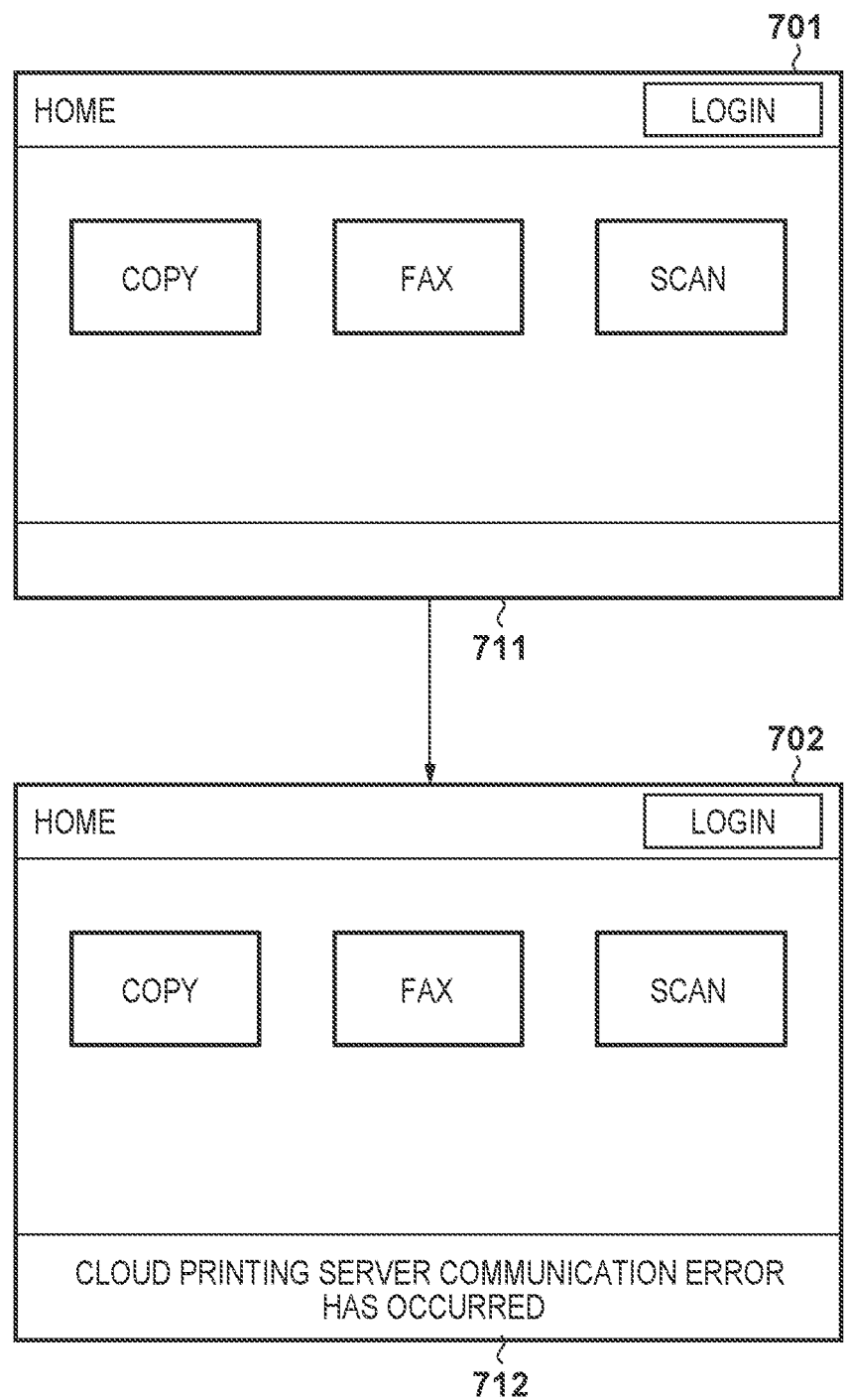
FIG. 7 is a diagram illustrating a display panel of the printing apparatus when a server communication error occurs.

FIG. 7 is a diagram illustrating a display panel of a printing apparatus when a server communication error occurs. Illustrated is an example of a screen, screen 701, displayed on the control panel 411 when an error occurs with the printing apparatus 101. A status line 711 is an area for displaying information relating to when an error or the like occurs with the printing apparatus. In the screen 701, as no error has occurred, nothing is displayed in the status line 711. Also, when an upper limit exceeded error is received for a device state notification, nothing is displayed in the status line 711.

Also illustrated is screen 702 which is displayed on the control panel 411 when a server communication error has occurred with the printing apparatus 101 as described using FIG. 6. In a status line 712, a message communicating the information that a server communication error has occurred in the cloud printing is displayed in step S605.

Device State Example

FIG. 8 is a diagram illustrating the types of printer states (printer-states) of the printing apparatus 101. Printer state refers to the device state of the printing apparatus 101. The cloud printing device information management unit 305 of the printing apparatus 101 notifies the cloud printing service 102 via Update-Output-Device-Attributes of three types of printer-states.

The first state is an idle state 801. This is a state in which the printing apparatus 101 is not processing any print jobs and printing processing for any new jobs received can be started without waiting time. This is also referred to as the standby state.

The second state is a processing state 802. This is a state in which the printing apparatus 101 is executing a print job and any new jobs received are put on standby. This is also referred to as the processing in progress state.

The third state is a stopped state 803. This is a state in which the printing apparatus 101 cannot process a print job and a user operation is required to change states. This is also referred to as the stopped state. For example, when out of paper or out of toner, the device state of the printing apparatus 101 transitions to the stopped state.

Types of Responses by Cloud Printing Service

FIG. 9 is a diagram illustrating the types of statuses the printing apparatus 101 receives from the cloud printing service 102. As described in step S602 in FIG. 6, this is information set in the response to be received from the cloud printing service 102 by the printing apparatus 101. The status codes are sorted into the main categories of Informational 901, Success 902, Client Errors 903 and 904, and Server Error 905. The status codes are further sorted into sub-categories of more detailed types. An error control 911 indicates how the cloud printing error control unit 309 treats the status code.

The Informational 901 indicates that the request is a success and processing is continuing. Thus, regardless of any status code for the sub-category, normal is determined by the cloud printing error control unit 309. The status codes are codes in the one hundreds.

The Success 902 indicates that the request is a success and that processing has ended. Thus, regardless of any status code for the sub-category, normal is determined by the cloud printing error control unit 309. In FIG. 6 when these status codes are received, transmission success is determined in step S603. The status codes are codes in the two hundreds.

Client Errors 903 and 904 indicate that there is a problem in the request from the client causing an error to occur. Examples of errors include status code 400 (Bad Request), 401 (Unauthorized), 402 (Payment Required), and the like. The error responses are transmitted as responses without change even when the same request is transmitted by the client (printing apparatus 101). Accordingly, the cloud printing error control unit 309 determines that an error has occurred when one of these responses is received. The user is notified of these errors and prompted to take action.

However, the status code 429 (too many requests) occurs when the load at the cloud printing service 102 is temporarily too high and processing cannot be executed. In other words, when the same request is transmitted by the client (printing apparatus 101), there is a possibility that the problem state has been resolved. Thus, the cloud printing error control unit 309 does not treat the status code 429 as an error.

The Server Error 905 indicates server failure to process the request. An example of this error includes a status code 500 (Internal Server Error) and the like. This error indicates that some kind of error has occurred in the server, and whether or not the problem is temporary cannot be determined. Accordingly, the cloud printing error control unit 309 determines this status code to be an error and notifies the user by displaying the error.

According to the configurations and processes described above, in the present embodiment, even when a response indicating upper limit exceeded is received from the cloud printing service (server) in response to a device state notification from the printing apparatus, notifications to the user are suppressed and the user is not notified. This can prevent the user from being notified of an error for a state for which action by the user is unnecessary. Also, since the response is to a request is a device state notification which does not directly involve the user, even if the user is notified of the upper limit being exceeded as an error, it would be difficult for the user to grasps the cause and subject matter and take action relating to the error. Regarding this, in the present embodiment described above, even when a response indicating that the upper limit is exceeded is received, notification to the user is suppressed and the user is not notified. This can prevent confusion in the operations of the cloud printing service.

Second Embodiment

Next, the second embodiment will be described. According to the configuration of the first embodiment described using diagrams up to FIG. 9, even when the printer state frequently changes, the occurrence of errors can be prevented. In the present embodiment, in addition to the prevention of errors, the printer state of the printing apparatus 101 managed by the cloud printing service 102 and the actual printer state of the printing apparatus 101 are made to match one another.

Accordingly, in the second embodiment, transmission of Update-Output-Device-Attributes is retried.

Figure 10:
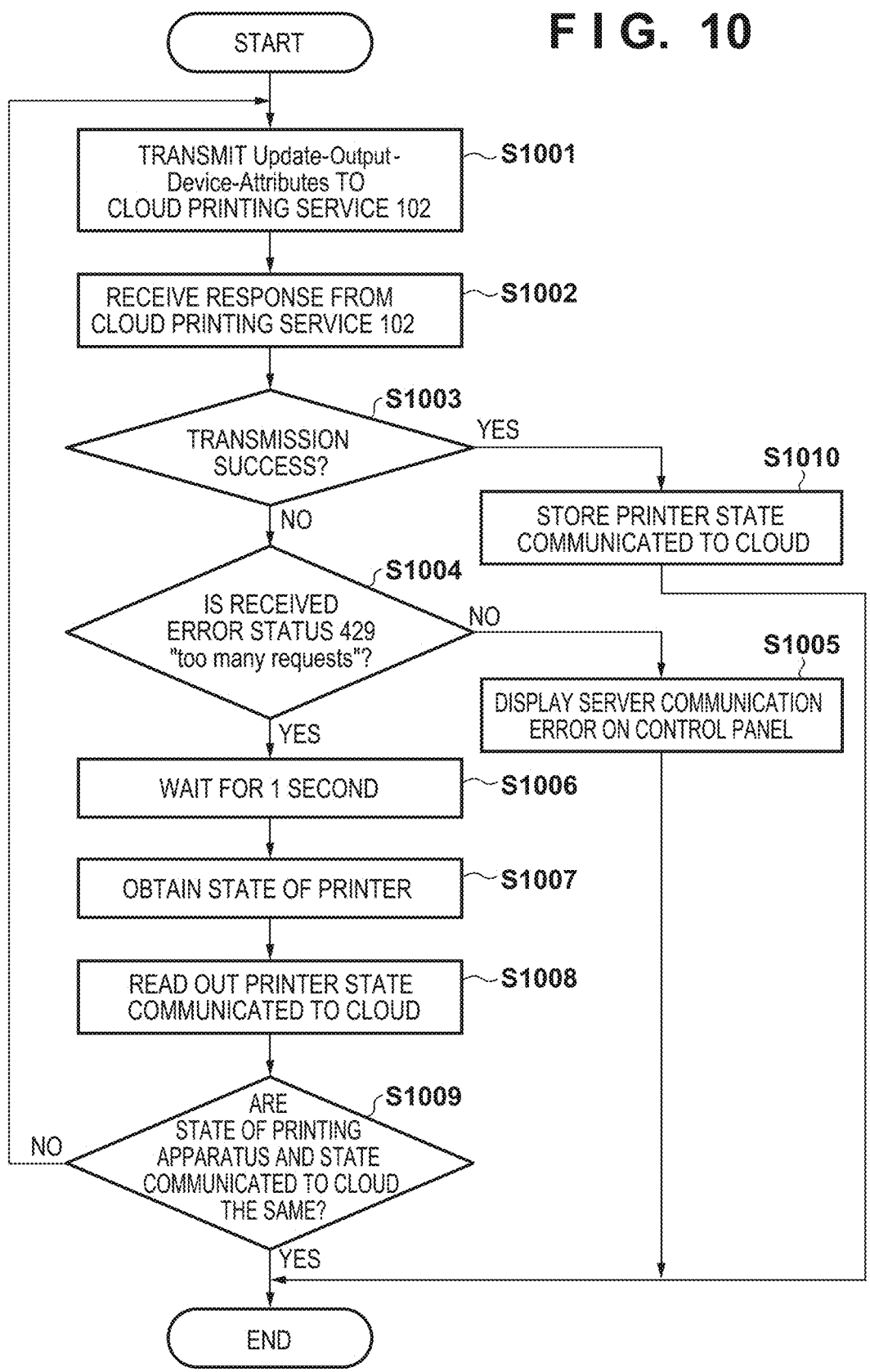
FIG. 10 is a flowchart of when a device state notification is transmitted according to a second embodiment.

FIG. 10 is a flowchart of when a device state notification is transmitted according to the second embodiment. The process in FIG. 10 is executed by the functional blocks such as the cloud printing device information management unit 305 implemented by a program being executed by the CPU 202. However, on the hardware side, this may be executed by the CPU 202 of the printing apparatus 101.

In step S1001, the cloud printing device information management unit 305 transmits Update-Output-Device-Attributes, in other words, a device state notification, to the cloud printing service 102. At this time, in the Update-Output-Device-Attributes, the printer-state attribute is set and the printer state (in other words, the device state) specified as the attribute value is set.

In step S1002, the cloud printing device information management unit 305 receives a response to the Update-Output-Device-Attributes transmitted in step S1001 from the cloud printing service 102.

In step S1003, the cloud printing device information management unit 305 references the status code of the response received in step S1002 and proceeds to step S1010 if it is determined to be a success (for example, code 200) and proceeds to step S1003 if it is determined to be an error. An error may be a status other than a success.

In step S1010, the cloud printing device information management unit 305 stores the printer state communicated by the cloud printing service 102 in the storage unit 306.

In step S1004, the cloud printing error control unit 309 analyzes the contents of the received error and determines whether or not the status code is 429 "too many requests" (upper limit exceeded). When the status code is 429 "too many requests", the processing of step S1006 is executed. When the status code is not 429 "too many requests", in step S1005, the operation control unit 300 displays a server communication error on the control panel 411. Note that the error may be displayed on the remote UI of the client terminal 100 which is the transmission source of the print request 119.

In step S1006, the cloud printing device information management unit 305 waits for the processing for a predetermined amount of time, for example, 1 sec. Subsequently, in step S1007, the cloud printing device information management unit 305 obtains the latest (in other words, current) state of the printer. Also, in step S1008, the cloud printing device information management unit 305 reads out the printer state communicated to the cloud from the storage unit 306. In step S1009, the cloud printing device information management unit 305 compares the latest state of the printer and the state of the printer communicated to the cloud. When the result of the comparison is a match, the processing ends. Also, when the result of the comparison is not a match, the processing returns to step S1001, and the processing to transmit the Update-Output-Device-Attributes to the cloud printing service 102 is retried, or in other words, retransmission is performed. The device state to be transmitted may be the device state obtained in step S1007.

According to this process, when the error status received as a device state notification response is upper limit exceeded, a device state notification is attempted after a predetermined amount of time has elapsed. Since there is a possibility that the upper limit exceeded state has been resolved by waiting for a predetermined period of time, if the upper limit exceeded state has been resolved, the retransmission (retry) will succeed. In this manner, the cloud printing service can be notified of the device state without the user being notified of an error.

Note that in FIG. 10, the device state notification is retransmitted on the condition that the current state of the printing apparatus 101 and the device state stored in the cloud printing service 102 do not match, but there may be no condition.

Modified Example

Regarding the process in FIG. 10, an upper limit to the number of retransmissions may be provided. For example, an upper limit to the number of retransmissions is provided, and when the status received in step S1004 in the process in FIG. 10 is the upper limit exceeded, first, whether the number of retransmissions has reached the upper limit is determined. When the upper limit has been reached, in step S1005, it is displayed that a response indicating upper limit exceeded has been received. On the other hand, when the upper limit has not been reached, the processing of step S1006 and below is executed. The upper limit to the number of retransmissions may be a fixed value or may be set by the user. According to this configuration, when the upper limit being exceeded has not resolved after a predetermined number of retries, information indicating that a response indicating upper limit exceeded has been received from the cloud printing service 102 is displayed. This allows the user to wait for resolution of the upper limit exceeded state.

Third Embodiment

Next, the third embodiment will be described. According to the configuration described in FIG. 10, a server communication error is not displayed on the display panel even when an upper limit exceeded (429 "too many requests") error occurs. This is because, even when a printer state notification fails, printing using the cloud printing can continue to be used and because the upper limit exceeded error is an error indicating a temporary high load of the server that may resolved itself over time. In the configuration of the third embodiment described below, a setting is provided for selecting whether or not to display an upper limit exceeded error as an error. By displaying the error, the user of the printing apparatus 101 can learn that the cloud printing service 102 is in a high load state and can be prompted to wait until the upper limit exceeded state is resolved.

Figure 11:
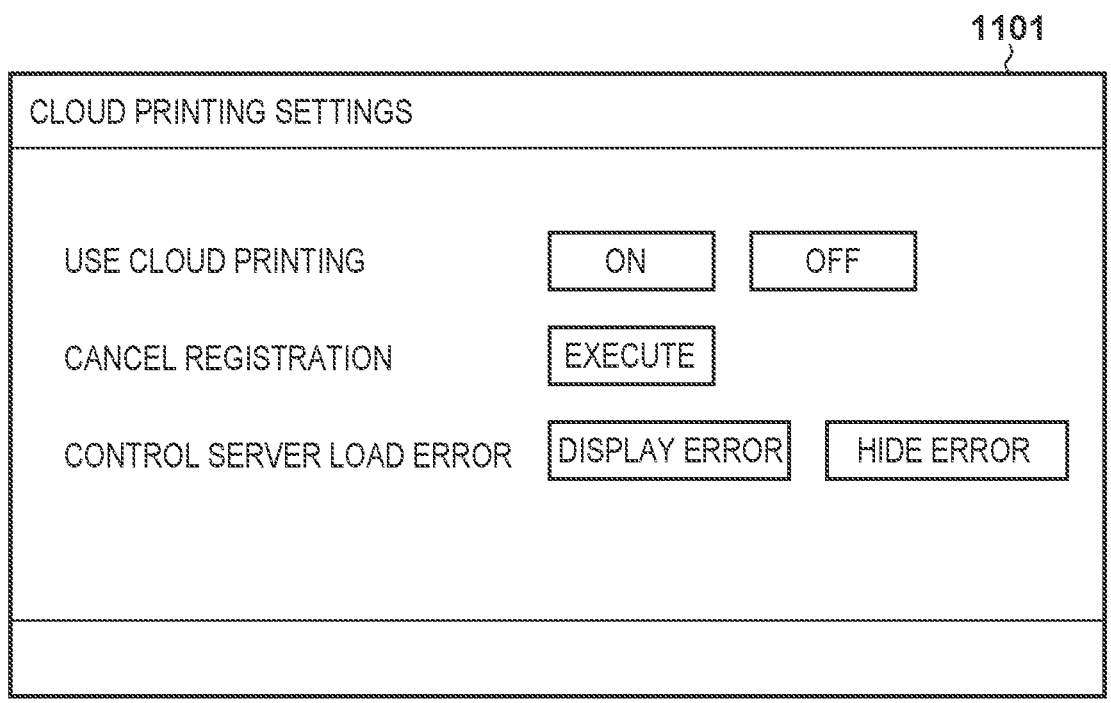
FIG. 11 is a diagram illustrating a cloud printing settings screen according to a third embodiment.

FIG. 11 is a diagram illustrating a cloud printing settings screen according to the third embodiment. This screen may be a screen displayed on the control panel 411 of the printing apparatus 101 or may be a screen displayed on the remote UI of the client terminal 100.

A screen 1101 is the cloud printing settings screen displayed on the control panel 411. The "use cloud printing" setting is a setting for switching between enabling and disabling the cloud printing function. The "cancel registration" setting is a setting for cancelling the registration of the printing apparatus 101 with the cloud printing service 102. The "server load error control" setting is a setting for switching between displaying and not displaying the error on the control panel 411 or the remote UI when the 429 "too many requests" error is received. When this setting is set, the value for the server load error control setting according to the selection is stored in the storage unit 306.

Figure 12:
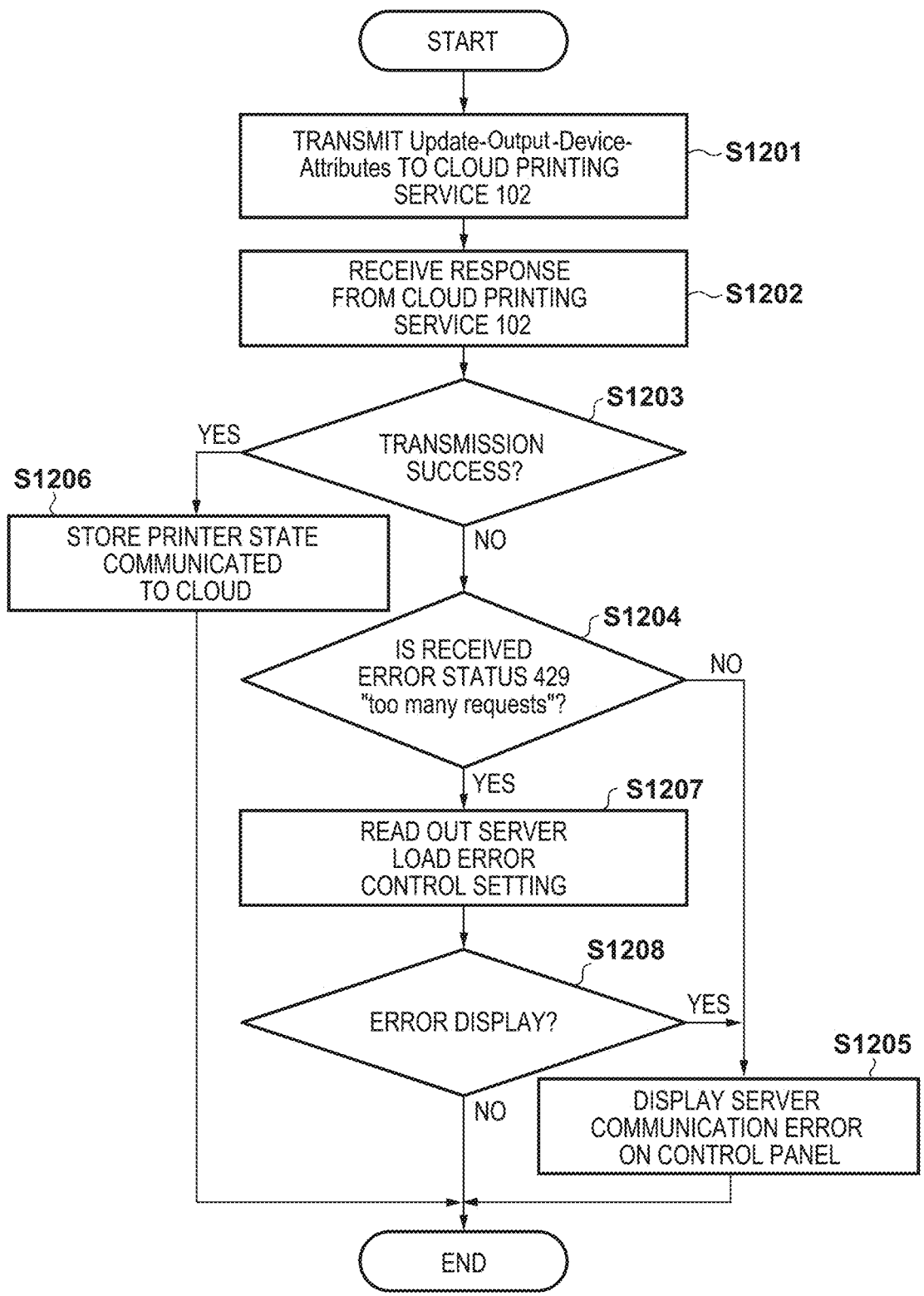
FIG. 12 is a flowchart of when a device state notification is transmitted according to the third embodiment.

FIG. 12 is a flowchart of when a device state notification is transmitted according to the third embodiment. The process in FIG. 12 described below is executed by the functional blocks such as the cloud printing device information management unit 305 implemented by a program being executed by the CPU 202. However, on the hardware side, this may be executed by the CPU 202 of the printing apparatus 101.

In step S1201, the cloud printing device information management unit 305 transmits Update-Output-Device-Attributes, in other words, a device state notification, to the cloud printing service 102. At this time, in the Update-Output-Device-Attributes, the printer-state attribute is set and the printer state (in other words, the device state) specified as the attribute value is set.

In step S1202, the cloud printing device information management unit 305 receives a response to the Update-Output-Device-Attributes transmitted in step S1201 from the cloud printing service 102.

In step S1203, the cloud printing device information management unit 305 references the status code of the response received in step S1202 and proceeds to step S1206 if it is determined to be a success (for example, code 200) and proceeds to step S1204 if it is determined to be an error. An error may be a status other than a success.

In step S1206, the cloud printing device information management unit 305 stores the printer state communicated by the cloud printing service 102 in the storage unit 306.

In step S1204, the cloud printing error control unit 309 analyzes the contents of the received error and determines whether or not the status code is 429 too many requests (upper limit exceeded). When it is 429 too many requests, the processing proceeds to step S1207. In step S1207, the cloud printing error control unit 309 reads out the server load error control setting from the storage unit 306. In step S1208, the cloud printing error control unit 309 determines whether or not the server load error control setting read out is the "error display" setting. When it is not the "error display" setting, the processing ends. When it is the "error display" setting, in step S1205, the operation control unit 300 displays a server communication error on the control panel 411.

In step S1204, when it is determined to not be 429 too many requests, in step S1205, the operation control unit 300 displays a server communication error on the control panel 411.

According to the process described above, whether or not to notify the user of an error when the error status received as a device state notification response is upper limit exceeded can be selected. In a similar manner to the first embodiment, when do not notify is selected, the processing ends without error notification. On the other hand, when notify is selected, the user is notified of the upper limit exceeded error. Accordingly, the user can temporarily suspend the processing by the printing apparatus 101, creating the opportunity to wait for the upper limit exceeded error to resolve.

Fourth Embodiment

Next, the fourth embodiment will be described. Tenancy is a concept in cloud applications, and users and devices belong to a tenant and the cloud printing service can be used on a tenant basis. In the configuration described using diagrams up to FIG. 12, the printing apparatus 101 is registered as the printing apparatus of one tenant. However, in another configuration, one printing apparatus may be registered in a plurality of tenants as different cloud printers. In the configuration according to the fourth embodiment, one printing apparatus is shared by a plurality of tenants, and the "server load error control" setting for each tenant can be set.

FIG. 13 is a diagram illustrating a cloud printing settings screen according to the fourth embodiment. A screen 1301 is a top menu of a cloud printing settings screen displayed on the control panel 411 or the remote UI of the client terminal 100. In the fourth embodiment, a printer can be registered in a plurality of tenants as different cloud printers. In the present embodiment, the printing apparatus 101 is already registered in tenant A and tenant B. The "use cloud printing" setting is a setting for switching between enabling and disabling the cloud printing function. This setting can be set per tenant, but in this example, the setting is shared by all of the tenants the printing apparatus 101 is registered with.

In the screen 1301, buttons for tenant A, tenant B, and add tenant are also displayed. When the add tenant button is pressed, a screen for registering the printing apparatus 101 as a cloud printer with a new tenant is transitioned to. If the setting of a tenant is desired to be changed, the corresponding tenant button can be pressed. By touching the tenant button (tenant A or tenant B), a settings screen 1302 for the tenant corresponding to the button touched is transitioned to. In the present embodiment, the settings screen 1302 for tenant A is illustrated.

In the settings screen 1302 for tenant A, the "cancel registration" setting and the "server load error control" setting are displayed. The "cancel registration" setting is a setting for cancelling cloud printing registration. The "server load error control" setting is a setting for switching between displaying and not displaying the error on the control panel 411 when the 429 "too many requests" error is received. Both of these settings only affect the behavior of the cloud printer registered with tenant A. Depending on the setting, the setting value is associated with the setting target tenant and stored in the storage unit 306.

The stored "server load error control" setting is referenced in step S1207 in FIG. 12 in a similar manner to the third embodiment. However, in the present embodiment, the referenced "server load error control" setting is a "server load error control" setting stored and associated with a tenant to which the client who is the issuer of the print request being executed belongs. Since the transmission of the print request has been instructed by a user logged into the cloud printing service, the tenant that the user belongs to may be a tenant associated with the "server load error control" setting.

According to the configuration described above, whether or not to notify the user of an error when the error status received as a device state notification response is upper limit exceeded can be selected. Furthermore, in the present embodiment, this can be selected for each tenant that the printing apparatus belongs to. In a similar manner to the first embodiment, when do not notify is selected, the processing ends without error notification. On the other hand, when notify is selected, the user is notified of the upper limit exceeded error. Accordingly, the user can temporarily suspend the processing by the printing apparatus 101, creating the opportunity to wait for the upper limit exceeded error to resolve.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-110588, filed Jul. 8, 2022, which is hereby incorporated by reference herein in its entirety.

What is claimed is:

1. A printing apparatus that executes printing on a basis of print data obtained from a server system, the printing apparatus comprising:
at least one processor and at least one memory comprising at least one program, wherein the at least one program is configured to cause the at least one processor to:
transmit, to the server system, a notification of a state of the printing apparatus according to progress of the printing;
receive, from the server system, a response to the transmitted notification of the state;
output an error according to the response when the response received does not indicate transmission success and does not indicate that a load of the server system exceeds an upper limit;
continue processing without outputting the error when the response received indicates transmission success; and
continue processing without outputting the error when the response received indicates that the load of the server system exceeds the upper limit.

2. The printing apparatus according to claim 1, wherein the at least one program is configured to cause the at least one processor to:
retransmit the notification of the state when the response received indicates that the load of the server system exceeds the upper limit.

3. The printing apparatus according to claim 2, wherein the at least one program is configured to cause the at least one processor to:
retransmit the notification of the state after waiting for a predetermined amount of time after reception of the response.

4. The printing apparatus according to claim 2, wherein the at least one program is configured to cause the at least one processor to:
when a particular response indicating that the load of the server system exceeds the upper limit is received with respect to a predetermined number of retransmissions of the notification of the state, output information indicating that the particular response has been received.

5. The printing apparatus according to claim 1, wherein the at least one program is configured to cause the at least one processor to:
retransmit the notification of the state when the response received indicates that the load of the server system exceeds the upper limit and when a state of the printing apparatus communicated by the notification and a current state of the printing apparatus do not match.

6. The printing apparatus according to claim 1, wherein the at least one program is configured to cause the at least one processor to:
set a setting for whether or not to output information indicating that a particular response indicating that the load of the server system exceeds the upper limit has been received when the particular response is received, and when the particular response indicating that the load of the server system exceeds the upper limit is received, reference the setting and output information indicating that the particular response has been received if the setting is set to output information indicating that the particular response has been received.

7. The printing apparatus according to claim 6, wherein the setting is set for each tenant that the printing apparatus belongs to.

8. The printing apparatus according to claim 1, wherein when a particular response indicating that the load of the server system exceeds the upper limit is received, information indicating that the particular response has been received is displayed on a display unit of the printing apparatus.

9. The printing apparatus according to claim 1, wherein when a particular response indicating that the load of the server system exceeds the upper limit is received, information indicating that the particular response has been received is displayed on a remote user interface of a terminal connected to the printing apparatus.

10. A non-transitory computer readable medium having stored a program thereon for causing a computer to:
transmit, to a server system, a notification of a state of a printing apparatus according to progress of printing;
receive, from the server system, a response to the transmitted notification of the state;
output an error according to the response when the response received does not indicate transmission success and does not indicate that a load of the server system exceeds an upper limit;
continue processing without outputting the error when the response received indicates transmission success; and
continue processing without outputting the error when the response received indicates that the load of the server system exceeds the upper limit.

11. A control method for a printing apparatus that executes printing on a basis of print data obtained from a server system, the printing apparatus including a transmitter, a receiver, and a controller, and the control method comprising:
the transmitter transmitting, to the server system, a notification of a state of the printing apparatus according to progress of the printing;
the receiver receiving, from the server system, a response to the transmitted notification of the state;
the controller outputting an error according to the response when the response received does not indicate transmission success and does not indicate that a load of the server system exceeds an upper limit;
the controller continuing processing without outputting the error when the response received indicates transmission success; and
the controller continuing processing without outputting the error when the response received indicates that the load of the server system exceeds the upper limit.

* * * * *